United States Patent [19]

Aoyagi et al.

[11] Patent Number: 4,560,720
[45] Date of Patent: Dec. 24, 1985

[54] COMPOSITIONS OF POLYVINYL CHLORIDE AND TETRACARBOXYLIC TETRAESTERS AND MEDICAL ARTICLES THEREOF

[75] Inventors: Juuro Aoyagi, Tokyo; Toshiji Ichikawa, Chofu; Mikio Koide, Yamanashi; Takeshi Shimomura, Kawasaki, all of Japan

[73] Assignee: Terumo Kabushiki Kaisha, Tokyo, Japan

[21] Appl. No.: 542,355

[22] Filed: Oct. 17, 1983

[30] Foreign Application Priority Data

Oct. 20, 1982 [JP] Japan .................... 57-183002

[51] Int. Cl.$^4$ ............................ C08K 5/10
[52] U.S. Cl. ..................... 524/288; 524/289; 524/290; 524/292; 524/294; 604/96; 604/93; 604/246; 604/266; 604/280; 604/408
[58] Field of Search .......... 524/289, 288, 290, 292, 524/294; 604/96, 246, 93, 266, 280, 408

[56] References Cited

U.S. PATENT DOCUMENTS 2,963,461 12/1960 Pockel .......................... 524/290
3,379,753 4/1968 Bremmer et al. ............. 524/290
4,265,276 5/1981 Hatada et al. ................ 604/280
4,381,210 4/1983 Ishizuka et al. .............. 427/208.2

FOREIGN PATENT DOCUMENTS 0088771 7/1980 Japan .

OTHER PUBLICATIONS

C.A. No. 73149a Poly(vinyl chloride) composition with improved electrical and heat resistance (Japan), Aug. 1972.

Primary Examiner—John Kight
Assistant Examiner—Garnette D. Draper
Attorney, Agent, or Firm—Frishauf, Holtz, Goodman & Woodward

[57] ABSTRACT

Medical articles made of a resin composition comprising a polyvinyl chloride and a tetracarboxylic tetraester are provided. As examples of the tetracarboxylic tetraester are mentioned tetra(2-ethylhexyl) 3,3',4,4'-biphenylethertetracarboxylate, tetra(2-ethylhexyl) 3,3',4,4'-biphenylmethanetetracarboxylate, tetra(n-dodecyl) 2,3,3',4'-biphenyl-1,1-ethanetetracarboxylate, tetra(2-ethylhexyl) 3,3',4,4'-biphenyl-2,2-propanetetracarboxylate and the like. The tetracarboxylic tetraester is incorporated in an amount from 20 to 120, preferably from 30 to 100 parts by weight per 100 parts by weight of the polyvinyl chloride. As dissolution and migration to the surface of the article of the plasticizer tetracarboxylic tetraester are low in the medical articles, said medical articles produce no adverse effects upon body fluids such as blood when contacted. Examples of preferred medical articles are blood preservation vessels, catheters and blood transfusion sets.

13 Claims, 1 Drawing Figure

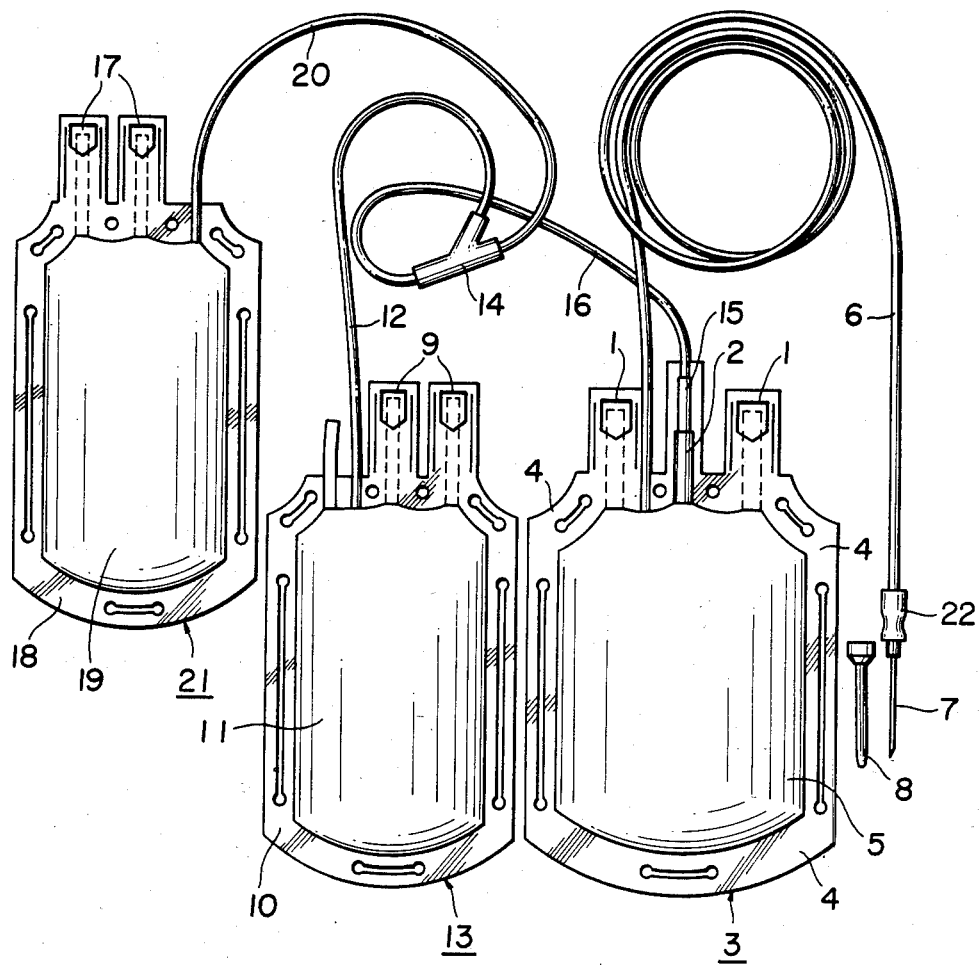

COMPOSITIONS OF POLYVINYL CHLORIDE AND TETRACARBOXYLIC TETRAESTERS AND MEDICAL ARTICLES THEREOF

BACKGROUND OF THE INVENTION

1. Field of the Invention

This invention relates to medical articles. More particularly, it is concerned with medical articles made of a polyvinyl chloride compound which has excellent properties such as maintaining functions of blood constituents during preservation.

2. Description of the Prior Art

It is well known that blood has autoprotecting activities and, when contacted with foreign surfaces other than the internal wall of blood vessels, is encountered with adhesion to the foreign surfaces and agglutination of thrombocytes and gellation of blood plasma, that is fibrin bridges. With prior-art blood bags, thrombocytes in the blood is agglutinated on the plastic surface, and thrombocytic agglutinating activity is reduced to approximately 60% in 6 hours after blood collection and further to approximately 40% in 24 hours. Therefore, it is desirable that preservation vessels or other medical articles made of plastics capable of preserving blood cells for a longer period of time, that is, those which are compatible with blood be developed in order to enable efficient use of thrombocyte preparations.

Presently, as the plastic vessels or other medical articles are widely used blood bags made of soft polyvinyl chloride compound because of its properties such as good workability and pliability, low permeability to water vapor and high heat resistance. The soft polyvinyl chloride compound contains, as a plasticizer, from 30 to 60% of phthalic esters such as di-2-ethylhexyl phthalate (called DOP hereinbelow). It is known that the phthalic ester which is highly migratory is dissoluted into blood plasma when the soft polyvinyl chloride compound is formed, for example, into a blood preservation vessel. It is reported that if phthalic esters are dissolved into blood plasma containing concentrated thrombocytes due to the above-mentioned property, reduction in the coagulability which is a function of the thrombocyte is caused [Nihon Yuketsu Gakkaishi (Journal of the Blood Transfusion Society of Japan) 28, 282 (1982)].

On the other hand, polyester plasticizers are used as the non-migratory plasticizer. It is well known, however, that the polyester plasticizers which are principally composed of aliphatic esters are in general inferior in such properties as water resistance and hydrolyzability to phthalic esters which contain phenyl group as the skeleton.

SUMMARY OF THE INVENTION

It is therefore an object of the invention to provide novel medical articles. Another object of the invention is to provide medical articles of good compatibility with blood. A further object of the invention is to provide medical articles such as blood preservation vessels, catheters and blood circuits in which migration of the plasticizer is inhibited and which have high water resistance.

According to the present invention, medical articles made of a resin composition comprising a polyvinyl chloride and a tetracarboxylic tetraester represented by the general formula I

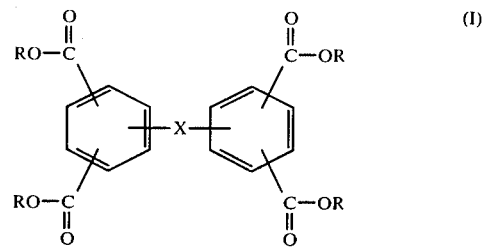

wherein X is —O—, —(CH$_2$)$_n$— (in which n is an integer from 1 to 6), —C(CH$_3$)$_2$—, —CH(CH$_3$)—, —S—, —CH(CF$_3$)—, —C(CF$_3$)$_2$—,

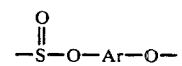

(in which Ar is an aryl group) or

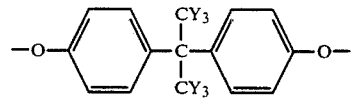

(in which Y is H or F) and R is an aliphatic saturated hydrocarbon group containing from 4 to 18 carbon atoms are provided.

This invention is also concerned with medical articles wherein the tetracarboxylic tetraester represented by the general formula I is incorporated in an amount from 20 to 120 parts by weight per 100 parts by weight of the polyvinyl chloride. Furthermore, the invention relates to medical articles wherein the tetracarboxylic tetraester represented by the general formula I is incorporated in an amount from 30 to 100 parts by weight per 100 parts by weight of the polyvinyl chloride. The invention is concerned with medical articles wherein the X is a member selected from the group consisting of —O—, —(CH$_2$)$_n$— (in which n is an integer from 1 to 6), —C(CH$_3$)$_2$ and —CH(CH$_3$)—. The invention also relates to medical articles wherein the X is a member selected from the group consisting of —O— and —(CH$_2$)$_n$— (in which n is an integer 1 or 2). Furthermore, the invention is concerned with medical articles wherein the R is an aliphatic saturated hydrocarbon group containing from 4 to 12 carbon atoms. The invention also relates to medical articles wherein the R is an aliphatic saturated hydrocarbon group containing from 8 to 12 carbon atoms. Furthermore, the invention is concerned with medical articles wherein the body fluid is blood. The invention also relates to medical articles which are catheters, blood transfusion sets, aqueous infusion sets or blood circuits.

BRIEF DESCRIPTION OF THE DRAWING

The drawing is the front view of a blood bag illustrating a medical articles according to the present invention.

DETAILED DESCRIPTION OF THE INVENTION

Medical articles according to the present invention mean body fluid preservation vessels such as blood bags, catheters, blood transfusion sets, aqueous infusion sets and blood circuits. Preferably they are body fluid preservation vessels, particularly blood bags.

The polyvinyl chloride used in a resin composition constituting medical articles of the invention includes, in addition to homopolymers of vinyl chloride, polyvinylidene chloride and copolymers with other comonomers, said copolymers containing 50% by weight or more, preferably 60% by weight or more and most preferably 90% by weight or more of vinyl chloride. The average degree of polymerization is in the range from 700 to 3,000, preferably from 1,000 to 2,700. As the comonomer with vinyl chloride are mentioned vinylidene-chloride, ethylene, propylene, vinyl acetate, vinyl bromide, vinyl fluoride, styrene, vinyltoluene, vinylpyridine, acrylic acid, alkyl acrylates (for example, methyl, ethyl, isopropyl, n-butyl, 2-ethylhexyl acrylates and the like), methacrylic acid, alkyl methacrylates (for example, methyl, ethyl, 2-ethylhexyl methacrylates and the like), acrylonitrile, methacrylonitrile and the like). The polyvinyl chloride may also be incorporated with a styrene-acrylonitrile or -methacrylonitrile copolymer.

The tetracarboxylic tetraester used as the plasticizer is a compound represented by the aforementioned general formula I which is employed in a ratio of from 20 to 120 parts by weight, preferably from 30 to 100 parts by weight to 100 parts by weight of the polyvinyl chloride. The R in the general formula I is an aliphatic saturated hydrocarbon group containing from 4 to 18, preferably from 4 to 12 and most preferably from 8 to 12 carbon atoms. The aliphatic saturated hydrocarbon group may be a straight or branched hydrocarbon group.

The compounds of the aforementioned general formula I include tetraesters represented by the general formulae II–V.

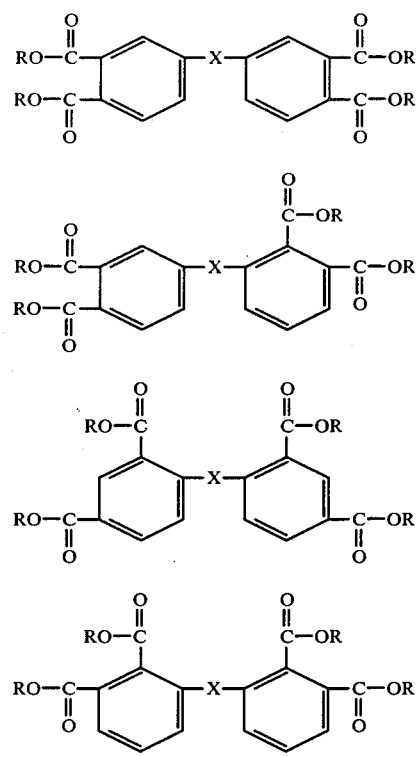

In the above general formulae II and III, X is —O—, —CH$_2$)$_n$ (in which n is an integer from 1 to 6, preferably 1 or 2), —C(CH$_3$)$_2$—, —CH(CH$_3$), —S—, —CH(CF$_3$)—, —C(CF$_3$)$_2$—,

—O—Ar—O— (in which Ar is an aryl group) or

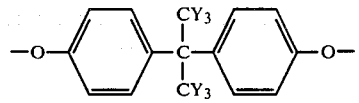

(in which Y is H or F), preferably —O—, —CH$_2$)$_n$ (in which n is as defined above), —C(CH$_3$)$_2$— or —CH(CH$_3$) and most preferably —O— or —CH$_2$)$_n$ (in which n is an integer 1 or 2); R is an aliphatic saturated hydrocarbon group containing from 4 to 18, preferably from 4 to 12 and most preferably from 8 to 12 carbon atoms.

As the tetracarboxylic tetraester represented by the general formula II are mentioned tetra(n-octyl) 3,3',4,4'-biphenylethertetracarboxylate, tetra(2-ethylhexyl) 3,3',4,4'-biphenylethertetracarboxylate, tetra(2-methylheptyl) 3,3',4,4'-biphenylethertetracarboxylate, tetra(n-nonyl) 3,3',4,4'-biphenylethertetracarboxylate, tetra(n-dodecyl) 3,3',4,4'-biphenylethertetracarboxylate, tetra(n-tetradecyl) 3,3',4,4'-biphenylethertetracarboxylate, tetra(n-hexyl) 3,3'-4,4'-biphenylethertetracarboxylate, tetra(n-butyl) 3,3',4,4'-biphenylethertetracarboxylate, tetra(n-octyl) 3,3',4,4'-biphenylmethanetetracarboxylate, tetra(2-ethylhexyl) 3,3',4,4'-biphenylmethanetetracarboxylate, tetra(2-methylheptyl) 3,3',4,4'-biphenylmethanetetracarboxylate, tetra(n-nonyl) 3,3',4,4'-biphenylmethanetetracarboxylate, tetra(n-nonyl) 3,3',4,4'-biphenylethanetetracarboxylate, tetra(n-dodecyl) 3,3',4,4'-biphenylmethanetetracarboxylate, tetra(n-octyl) 3,3',4,4'-biphenyl-1,2-ethanetetracarboxylate, tetra(2-ethylhexyl) 3,3',4,4'-biphenyl-1,2-ethanetetracarboxylate, tetra(n-decyl) 3,3',4,4'-biphenyl-1,2-ethanetetracarboxylate, tetra(n-dodecyl) 3,3',4,4'-biphenyl-1,2-ethanetetracarboxylate, tetra(n-octyl) 3,3',4,4'-biphenyl-1,1-ethanetetracarboxylate, tetra(2-ethylhexyl) 3,3',4,4'-biphenyl-1,1-ethanetetracarboxylate, tetra(n-decyl) 3,3',4,4'-biphenyl-1,1-ethanetetracarboxylate, tetra(n-octyl) 3,3',4,4'-biphenyl-2,2-propanetetracarboxylate, tetra(2-ethylhexyl) 3,3',4,4'-biphenyl-2,2-propanetetracarboxylate, tetra(n-decyl) 3,3',4,4'-biphenyl-2,2-propanetetracarboxylate, tetra(n-dodecyl) 3,3',4,4'-biphenyl-2,2-propanetetracarboxylate, tetra(n-octyl) 3,3',4,4'-biphenylthioethertetracarboxylate, tetra(2-ethylhexyl) 3,3',4,4'-biphenylthioethertetracarboxylate, tetra(n-dodecyl) 3,3',4,4'-biphenylthioethertetracarboxylate, 1,1-bis (3,4-dicarboxyphenyl)trifluoroethane tetra(n-octyl) ester, 1,1-bis(3,4-dicarboxyphenyl)trifluoroethane tetra 2-ethylhexyl) ester, 1,1-bis(3,4-dicarboxyphenyl)trifluoroethane tetra(n-decyl) ester, 2,2-bis(3,4-dicarboxyphenyl)hexafluoropropane tetra(2-ethylhexyl) ester, 2,2-bis(3,4-dicarboxyphenyl)hexafluoropropane tetra(n-octyl) ester, 2,2-bis(3,4-dicarboxyphenyl)hexafluoropropane tetra(2-ethylhexyl) ester, 2,2-bis(3,4-dicarboxyphenyl)hexafluoropropane tetra(n-dodecyl) ester, tetra(2-ethylhexyl) 3,3',4,4'-biphenylsulfoxidetetracarboxylate, tetra(n-decyl) 3,3',4,4'-biphenylsulfoxidetetracarboxylate, 2,2-bis[4-(3,4-dicarboxyphenoxy)phenyl]propane tetra(2- ethylhexyl) ester, 2,2-bis[4(3,4-dicarboxyphenoxy)-phenyl]hexafluoropropane tetra(2-ethylhexyl) ester, 2,2-bis(3,4-dicarboxyphenoxy)benzene tetra(2-ethylhexyl) ester and the like.

As the tetracarboxylic tetraester represented by the general formula III are mentioned, for example, tetra(n-octyl) 2,3,3′,4′-biphenylethertetracarboxylate, tetra(2-ethylhexyl) 2,3,3′,4′-biphenylethertetracarboxylate, tetra(2-methylheptyl) 2,3,3′,4′-biphenylethertetracarboxylate, tetra(n-nonyl) 2,3,3′,4′-biphenylethertetracarboxylate, tetra(n-dodecyl) 2,3,3′,4′-biphenylethertetracarboxylate, tetra(n-hexyl) 2,3,3′,4′-biphenylethertetracarboxylate, tetra(n-butyl) 2,3,3′,4′-biphenylmethanetetracarboxylate, tetra(n-octyl) 2,3,3′,4′-biphenylmethanetetracarboxylate, tetra(2-ethylhexyl) 2,3,3′,4′-biphenylmethanetetracarboxylate, tetra(n-decyl) 2,3,3′,4′-biphenylmethanetetracarboxylate, tetra(n-dodecyl) 2,3,3′,4′-biphenylmethanetetracarboxylate, tetra(n-octyl) 2,3,3′,4′-biphenyl-1,2-ethanetetracarboxylate, tetra(2-ethylhexyl) 2,3,3′,4′-biphenyl-1,2-ethanetetracarboxylate, tetra(n-decyl) 2,3,3′,4′-biphenyl-1,2-ethanetetracarboxylate, tetra(2-ethylhexyl) 2,3,3′,4′-biphenyl-1,1-ethanetetracarboxylate, tetra(n-dodecyl) 2,3,3′,4′-biphenyl-1,1-ethanetetracarboxylate, tetra(n-octyl) 2,3,3′,4′-biphenyl-2,2-propanetetracarboxylate, tetra(2-ethylhexyl) 2,3,3′,4′-biphenyl-2,2-propanetetracarboxylate, tetra(n-decyl) 2,3,3′,4′-biphenyl-2,2-propanetetracarboxylate, tetra(2-ethylhexyl) 2,3,3′,4′-biphenylthioethertetracarboxylate, tetra(n-dodecyl) 2,3,3′-4′-biphenylthioethertetracarboxylate, 1,1-(2,3-dicarboxyphenyl-3′,4′-dicarboxyphenyl)trifluoromethane tetra(2-ethylhexyl) ester, 1,1-(2,3-dicarboxyphenyl-3′,4′-dicarboxyphenyl)trifluoromethane tetra(n-decyl) ester, 2,2-(2,3-dicarboxyphenyl-3′,4′-dicarboxyphenyl)hexafluoropropane tetra(2-ethylhexyl) ester, 2,2-(2,3-dicarboxyphenyl-3′,4′-dicarboxyphenyl)hexafluoropropane tetra(n-decyl) ester, tetra(2-ethylhexyl) 2,3,3′,4′-biphenylsulfoxidetetracarboxylate, tetra(n-dodecyl) 2,3,3′,4′-biphenylsulfoxidetetracarboxylate and the like.

As the tetracarboxylic tetraester represented by the general formula IV are mentioned tetra(n-octyl) biphenylether-2,4,2′,4′-tetracarboxylate, tetra(2-ethylhexyl) biphenylether-2,4,2′,4′-tetracarboxylate, tetra(n-dodecyl) biphenylether-2,4,2′,4′-tetracarboxylate, tetra(2-ethylhexyl) 2,4,2′,4′-biphenylmethanetetracarboxylate, tetra(n-decyl) 2,4,2′,4′-biphenylmethanetetracarboxylate, tetra(2-ethylhexyl) 2,4,2′,4′-biphenyl-1,2-ethanetetracarboxylate, tetra(n-dodecyl) 2,4,2′,4′-biphenyl-1,2-ethanetetracarboxylate, 1,1-bis(2,4-dicarboxyphenyl)trifluoroethane tetra(2-ethylhexyl) ester, 2,2-bis(2,4-dicarboxyphenyl)hexafluoropropane tetra(2-ethylhexyl) ester and the like.

As the tetracarboxylic ester represented by the general formula V are mentioned tetra(n-octyl) 2,2′,3,3′-biphenylethertetracarboxylate, tetra(2-ethylhexyl) 2,2′,3,3′-biphenylethertetracarboxylate, tetra(n-dodecyl) 2,2′,3,3′-biphenylethertetracarboxylate, tetra(2-ethylhexyl) 2,2′,3,3′-biphenylmethanetetracarboxylate, tetra(n-nonyl) 2,2′,3,3′-biphenylmethanetetracarboxylate, tetra(2-ethylhexyl) 2,2′,3,3′-biphenyl-1,2-ethanetetracarboxylate, tetra(n-dodecyl) 2,2′,3,3′-biphenyl-1,2-ethanetetracarboxylate, tetra(2-ethylhexyl) 2,2′,3,3′-biphenyl-1,1-ethanetetracarboxylate, tetra(n-decyl) 2,2′,3,3′-biphenyl-1,1-ethanetetracarboxylate, tetra(2-ethylhexyl) 2,2′,3,3′-biphenylthioethertetracarboxylate, 2,2-bis(2,3-dicarboxyphenyl)propane tetra(2-ethylhexyl) ester, 2,2-bis-[4-(2,3-dicarboxyphenoxy)phenyl]propane tetra(2-ethylhexyl) ester and the like.

In preparing the tetraesters represented by the aforementioned general formula I, a corresponding tetracarboxylic acid or a dianhydride thereof, for example, is reacted with a corresponding aliphatic alcohol in an organic solvent (for example, p-xylene, o-xylene, a mixed xylene, benzene, toluene, cyclohexane, n-heptane or the like) or in the absence of an organic solvent in the presence of a catalyst, for example, titanium tetrabutoxide, an organic sulfonic acid such as p-toluenesulfonic acid, sulfuric acid, phosphoric acid, a phosphoric ester or the like at a reaction temperature in the range from 170° to 250° C. for a period of time from 5 to 100 hours.

In the aforementioned resin compositions composed of a polyvinyl chloride and a plasticizer are incorporated metal soaps as zinc stearate.

If needed, a vegetable oil such as epoxidized soybean oil or epoxidized linseed oil, a lubricant and additionally an antioxidant are incorporated.

The medical articles of the invention are produced by melt kneading the above-described composition by a conventional process and molding the kneaded mass by the use of an injection or extrusion molding machine.

Medical articles according to the invention will be described below taking as an example a blood collection bag with reference to the accompanying drawing. The drawing shows a blood bag. The blood bag 3 made of a polyvinyl chloride composition is equipped with plural outlets 1 each with a peelable tab and the outlet 2 and heat-sealed in the circumferential portion by high-frequency heating or another heating means. The blood collection tube 6 made of a polyvinyl chloride composition is connected with the internal space 5 of said blood collection bag. In the internal space of the blood collection bag is placed the ACD-A solution (containing, for example, 2.20 g. of sodium citrate, 0.80 g. of citric acid and 2.20 g. of glucose in 100 ml. of the aqueous solution), the CPD solution (containing, for example, 206 mg. of citric acid, 1.66 g. of sodium citrate, 140 mg. of disodium hydrogen phosphate and 1.46 g. of dextrose in 100 ml. of the aqueous solution) or the like. At the top of said blood collection tube 6 is provided the blood collection needle 7. The blood collection needle 7 is provided with the cap 8.

If subbags are connected with the above-described blood collection bag 3, the first subbag 13 made of a polyvinyl chloride composition, which is equipped with the outlets 9 with each with a peelable tab and heat-sealed in the circumferential portion 10 in the same way as above and the internal space 11 of which is connected with the connection tube 12 made of a polyvinyl chloride composition, is connected by means of the branched tube 14 with the connection tube 16 which is connected through the top connection needle 15 with the outlet 2 for connection of the blood collection bag 3. Also, the subbag 21 which is equipped with the outlets 17 each with a peelable tab and heat-sealed in the circumferential portion and the internal space of which is connected with the connection tube 20 made of a polyvinyl chloride composition, is connected via the aforementioned connection tube 20 by means of the branched tube 14 with the connection tubes 12 and 16.

In addition to the blood bag described above as an illustration, the present invention is also applicable to blood preservation vessels, blood transfusion systems, aqueous infusion systems, catheters, blood circuits, tubes for dialysis and the like.

The invention will be described in greater detail in conjunction with the following examples.

EXAMPLE 1

In a 1 l. eggplant type flask were replaced 201 g. (1 mol.) of 3-chlorophthalic acid, 166 g. (1 mol.) of 3-oxyphthalic acid, 200 ml. of dimethylformamide and 100 ml. of pyridine. A reflux condenser was attached to the flask and the mixture was heated at 150°–160° C. for 5 hours. After cooling, the reaction mixture was filtered and the precipitates were washed with water to give 281 g. of the crude product, which was recrystallized from hot water to afford 245 g. of 2,2′,3,3′-biphenylether tetracarboxylic acid as crystals. 50 g. of the crystals and 100 g. of acetyl chloride were replaced in a flask and a reflux condenser was attached thereto. The mixture was heated at 50°–60° C. for 3 hours to give 42 g. of the anhydride.

In a 1 l. three-necked flask were placed 93 g. (0.3 mol.) of 2,2′,3,3′-biphenylether tetracarboxylic dianhydride, 625 g. (4.8 mol.) of 2-ethylhexanol and 2.44 g. (6.2% of the ester) of p-toluenesulfonic acid as a catalyst. The mixture was heated at a reaction temperature of 180°–200° C. for 15 hours. After completion of the reaction, the reaction mixture was subjected to distillation under reduced pressure to recover excess 2-ethylhexanol. It was then washed with diluted aqueous alkali solution and water, respectively and finally distilled under reduced pressure to obtain 238.2 g. of tetra(2-ethylhexyl) 2,2′,3,3′-biphenylethertetracarboxylate. The ester has refractive index n of 1.495, a specific gravity d of 0.988 and a degree of esterification of 276.

A resin composition composed of 50 parts by weight of the plasticizer thus prepared, polyvinyl chloride (average degree of polymerization 1,300), 3 parts by weight of epoxidized soybean oil and 1 part by weight of calcium stearate and zinc stearate was thoroughly kneaded on a two-roll roller at a temperature of 150° C. to form a sheet 0.4 mm. in thickness.

Test pieces of the sheet were immersed in various solutions for a predetermined period of time and dried at a temperature of 70° C. for 10 hours. Weight changes of the test pieces between the pre- and post-immersion (amount of the plasticizer dissoluted) were examined to give the results shown in Table 1. When the test pieces were dried at 100° C. for 120 hours, weight loss by evaporation was 0.04% by weight.

Then, a test on the extractive substances was done according to 'the test processes for plastic containers for aqueous infusion', Japansese pharmacopoeia B-302 - 318. The results are shown in Table 2. Results of a toxicity test are shown in Table 3. Results of a test on physicochemical properties are shown in Table 4.

EXAMPLE 2

A resin composition composed of 50 parts by weight of tetra(2-ethylhexyl) 3,3′,4,4′-biphenylmethanetetracarboxylate prepared in the same way as in Example 1, polyvinyl chloride (degree of polymerization 1,300), 3 parts by weight of epoxidized soybean oil and 1 part of calcium stearate and zinc stearate was thoroughly kneaded by means of a two-roll roller at a temperature of 150° C. to form a sheet 0.4 mm. in thickness.

The sheet was subjected to the same tests as in Example 1. The weight changes are shown in Table 1. The weight loss by evaporation was 0.04% by weight. Results of the dissolution, toxicity and physicochemical tests are shown in Tables 2–4, respectively.

EXAMPLE 3

A resin composition composed of 50 parts by weight of tetra(n-dodecyl) 2,3,3′,4′-biphenyl-1,1-ethanetetracarboxylate prepared in the same way as in Example 1, polyvinyl chloride (degree of polymerization 1,300), 3 parts by weight of epoxidized soybean oil and 1 part by weight of calcium stearate and zinc stearate was thoroughly kneaded by means of a two-roll roller to form a sheet 0.4 mm. in thickness.

The sheet was subjected to the same tests as in Example 1. The weight changes are shown in Table 1. The weight loss by evaporation was 0.03% by weight. Results of the dissolution, toxicity and physicochemical tests are shown in Tables 2–4, respectively.

EXAMPLE 4

A resin composition composed of 50 parts by weight of tetra(2-ethylhexyl) 2,3,3′,4′-biphenyl-2,2-propanetetracarboxylate, polyvinyl chloride (degree of polymerization 1,300), 3 parts by weight of epoxidized soybean oil and 1 part by weight of calcium stearate and zinc stearate was thoroughly kneaded by means of a two-roll roller at a temperature of 150° C. to form a sheet 0.4 mm. in thickness.

The sheet was subjected to the same tests as in Example 1. The weight changes are shown in Table 1. The weight loss by evaporation was 0.03% by weight. Results of the dissolution, toxicity and physicochemical tests are shown in Tables 2–4, respectively.

COMPARATIVE EXAMPLE 1

The same process as in Example 1 was carried out except that di-2-ethylhexyl phthalate was employed in place of the tetraester to form a sheet 0.4 mm. in thickness.

The sheet was subjected to the same tests as in Example 1. The weight changes are shown in Table 1. The weight loss by evaporation was 3.7% by weight. Results of the dissolution, toxicity and physicochemical tests are shown in Tables 2–4, respectively.

COMPARATIVE EXAMPLE 2

The same process as in Example 1 was carried out except that di-(2-ethylhexyl) 2,2′-biphenyldicarboxylate was employed in place of the tetraester to form a sheet 0.04 mm. in thickness.

The sheet was subjected to the same tests as in Example 1. The weight changes are shown in Table 1. The weight loss by evaporation was 2.5% by weight. Results of the dissolution, toxicity and physicochemical tests are shown in Tables 2–4, respectively.

COMPARATIVE EXAMPLE 3

The same process as in Example 1 was carried out except that tetra-(2-ethylhexyl) bicyclo[2.2.2]oct-7-ene-2,3,5,6-tetracarboxylate was employed in place of the tetraester to form a sheet 0.4 mm. in thickness.

The sheet was subjected to the same tests as in Example 1. The weight changes are shown in Table 1. The weight loss by evaporation was 4.2% by weight. Results of the dissolution, toxicity and physicochemical tests are shown in Tables 2–4, respectively.

EXAMPLE 5

From 40 volumes of human venous blood collected by means of a plastic syringe containing 6 volumes of the solution ACD-A was obtained thrombocyte-rich plasma (PRP) by centrifugal separation (160 G, 10 min.). The PRP was aseptically subdivided in 2 ml. portions into minibags made of the sheets obtained in Examples 1–4 and Comparative Examples 1–3. In consideration of variations of the blood by individual 3 blood specimens were used for each test. Tests of the thrombocytic agglutinating activity for the PRP were conducted with the PRP's preserved in the bag at room temperature for 2, 6 and 24 hours.

Equipment used: Aggregometer AUTORAM-11 (manufactured by Rika Denki Kogyo K. K.)

Measurement temperature: 37° C.
Agitation rate: 1000 r.p.m.
Reagent: Final concentration of ADP $10^{-5}$ M.
Concentration of the reagent: PRP/Reagent = 10/1.

The maximum ratio of agglutination upon subdivision into a bag was taken as $A_1$. The maximum ratio of agglutination in a measurement after a period of time was taken $A_2$, $A_6$ or $A_{24}$. Comparisons were made on average values of the $A_2/A_1$, $A_6/A_1$ and $A_{24}/A_1$ respectively for 3 specimens, $M(A_2/A_1)$, $(A_6/A_1)$ and $M(A_{24}/A_1)$. Results of the measurements are shown in Table 5.

TABLE 1
(Unit: % by wt.)

| Solvent | Example | | | | Comparative Example | | |
|---|---|---|---|---|---|---|---|
| | 1 | 2 | 3 | 4 | 1 | 2 | 3 |
| 100% ethanol (25° C., 12 hrs.) | 0.40 | 0.50 | 0.48 | 0.48 | 14.25 | 11.42 | 12.00 |
| Solution ACD-A (100° C., 24 hrs.) | 0.01 | 0.01 | 0.01 | 0.01 | 0.3 | 0.2 | 0.3 |
| 0.9% physiological saline solution (100° C., 24 hrs.) | 0.01 | 0.01 | 0.01 | 0.01 | 0.3 | 0.2 | 0.3 |
| Sesame oil | 0.12 | 0.12 | 0.12 | 0.12 | 9.41 | 9.50 | 9.23 |
| Soybean oil | 0.11 | 0.11 | 0.12 | 0.10 | 9.56 | 9.73 | 9.21 |
| Liquid paraffin (70° C., 4 hrs.) | 0.07 | 0.10 | 0.09 | 0.08 | 0.8 | 0.7 | 0.7 |

TABLE 2

| Test item | Example | | | | Comparative Example | | | Base |
|---|---|---|---|---|---|---|---|---|
| | 1 | 2 | 3 | 4 | 1 | 2 | 3 | |
| Appearance | c | c | c | c | c | c | c | c |
| | t | t | t | t | t | t | t | t |
| Δ pH | 0.64 | 0.52 | 0.72 | 0.80 | 0.85 | 0.84 | 0.92 | ≦1.5 |
| Δ V (ml.) | 0.42 | 0.41 | 0.40 | 0.37 | 0.40 | 0.42 | 0.51 | ≦1.0 |
| Chloride (ml.) | ≦0.7 | ≦0.7 | ≦0.7 | ≦0.7 | ≦0.7 | ≦0.7 | ≦0.7 | ≦0.7 |
| Sulfate (ml.) | ≦2.0 | ≦2.0 | ≦2.0 | ≦2.0 | ≦2.0 | ≦2.0 | ≦2.0 | ≦2.0 |
| Ammonium (ml.) | ≦0.5 | ≦0.5 | ≦0.5 | ≦0.5 | ≦0.5 | ≦0.5 | ≦0.5 | ≦0.5 |
| Evaporation residue (mg.) | 0 | 0 | 0 | 0 | 0.02 | 0.04 | 0.04 | ≦5 |
| UV absorbance (220 nm) | 0.052 | 0.060 | 0.057 | 0.061 | 0.055 | 0.061 | 0.061 | ≦0.08 |
| UV absorbance (240 mn) | 0.038 | 0.032 | 0.030 | 0.032 | 0.030 | 0.049 | 0.049 | ≦0.05 | c: Colorless, t: transparent

TABLE 3

| Test item | Example | | | | Comparative Example | | |
|---|---|---|---|---|---|---|---|
| | 1 | 2 | 3 | 4 | 1 | 2 | 3 |
| Cytotoxicity* | − | − | − | − | − | + | + |
| Hemolytic toxicity** | − | − | − | − | − | − | − |

*In 3 ml. of the extraction medium (MEM) manufactured by Nissui Seiyaku K. K. was placed 1 g. of the test piece. Extraction was conducted at 121° C. for 20 min. The extraction medium was then diluted with the control medium followed by administration with the cells (HeLa-S3). On the 2nd and 3rd days, each medium was microscopically examined for deformation, detachment and growth inhibition of the cells in combination with the blank. The toxicity was judged based upon the status on the 2nd day. (−: Good growth, equivalent to the blank, ÷: Poor growth, +: Deformed or damaged, ++: detached).
**Measured on the basis of "the hemolysis test", B-305 (11) under "the test process for plastic containers for aqueous" in Explanations on the Japan Pharmacopoeia, 10th edition (−: Negative, +: Positive).

TABLE 4

| Test item | Example | | | | Comparative Example | | |
|---|---|---|---|---|---|---|---|
| | 1 | 2 | 3 | 4 | 1 | 2 | 3 |
| Initial modulus of elasticity* (kg./mm.²) | 1.94 | 1.98 | 1.98 | 2.00 | 1.92 | 1.94 | 1.91 |
| Strength at breakage* (kg./cm.²) | 272 | 263 | 265 | 267 | 262 | 266 | 260 |
| Seal strength** (kg./2 cm.) | 4.30 | 4.22 | 4.37 | 4.21 | 4.25 | 4.22 | 4.24 |
| Water permeability*** (%) | 0.92 | 0.87 | 0.84 | 0.84 | 1.4 | 0.92 | 1.30 |

*Measured according to JIS K 7113 (Dumbbell No. 2 used, n = 5).
**Seal surface 20 mm. in width, n = 5.
***Measured according to "Standards for the blood set made of polyvinyl chloride" after allowed to standard at 20° C. under 65% humidity for 14 days.

TABLE 5

| Test item | Example | | | | Comparative Example | | |
|---|---|---|---|---|---|---|---|
| | 1 | 2 | 3 | 4 | 1 | 2 | 3 |
| $M(A_2/A_1)$ | 0.98 | 1.00 | 0.97 | 0.96 | 0.92 | 0.90 | 0.90 |
| $M(A_6/A_1)$ | 0.81 | 0.82 | 0.87 | 0.81 | 0.62 | 0.58 | 0.55 |
| $M(A_{24}/A_1)$ | 0.60 | 0.63 | 0.64 | 0.64 | 0.43 | 0.42 | 0.40 |

As described above, in the medical articles according to the present invention, which are made of a resin composition comprising a polyvinyl chloride and a tetracarboxylic tetraester represented by the general formula I, the extracted amount of the plasticizer is far lower, being around 1/20, the evaporation loss is remarkably reduced and the migration to the surface is lower as compared with the cases using prior-art plasticizers such as di-2-ethylhexyl phthalate. Consequently, reduction in the thrombocytic agglutinating activity due to dissolution of the plasticizer into blood plasma when the medical article is contacted with body fluid such as blood is greatly improved. Especially, in the thrombocytic agglutinating activity test, the reduction ratio is far smaller than that in the prior-art articles, and the preservation period of time can remarkably be extended.

Satisfactory physicochemical properties can also be maintained with the above-mentioned advantages remaining when the incorporated amount of a tetracarboxylic tetraester represented by the general formula I is from 20 to 120 parts by weight, particularly from 30 to 100 parts by weight per 100 parts of the polyvinyl chloride. Therefore, the invention produces excellent results when used for medical articles such as body fluid preservation vessels such as blood plasma preservation vessels, catheters, blood transfusion sets, fluid transfusion sets and blood circuits, especially for the medical articles with which body fluids are directly contacted or agents to be delivered into the body are contacted.

When the medical article is a catheter in which di-2-ethylhexyl phthalate (DOP) is incorporated, the catheter becomes hardened due to elution of the plasticizer and difficult to take off after resided in the body for a long period of time (for example, 1-2 weeks). On the contrary, the medical articles according to the present invention will not be encountered with such problem because of a very small amount of the plasticizer eluted.

In addition, the blood circuit, when used for extracorporeal circulation of blood, for example, in the artificial kidneys, is usually operated for 5-6 hours at a time and 2-4 times a week. The medical articles according to the invention for such use do not cause less damage to the thrombocytic functions thereby producing less hemorrhage in patients than with the DOP-containing articles.

What we claim is:

1. A composition for formulating medical articles comprising a body fluid preservation vessel, a catherter, a blood transfusion set, an aqueous infusion set, or a blood circuit, said composition comprising a polyvinyl chloride and a tetracarboxylic tetraester represented by the general formula I

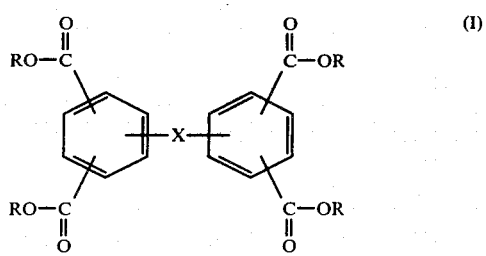

wherein X is —O—, —CH$_2$)$_n$ (in which n is an integer from 1 to 6), —C(CH$_3$)$_2$—, —CH(CH$_3$)—, —S—, —CH(CF$_3$)—, —C(CF$_3$)$_2$—,

—O—Ar—O— (in which Ar is an aryl group) or

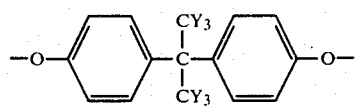

(in which Y is H of F) and R is an aliphatic saturated hydrocarbon group containing from 4 to 18 carbon atoms.

2. The composition of claim 1 wherein the tetracarboxylic tetraester represented by the general formula I is in an amount from 20 to 120 parts by weight per 100 parts by weight of the polyvinyl chloride.

3. The composition of claim 2 wherein the tetracarboxylic tetraester represented by the general formula I is incorporated in an amount from 30 to 100 parts by weight per 100 parts by weight of the polyvinyl chloride.

4. The composition of claim 1 wherein X is a member selected from the group consisting of —O—, —CH$_2$)$_n$ (in which n is an integer from 1 to 6), —C(CH$_3$)$_2$— and —CH(CH$_3$)—.

5. The composition of claim 4 wherein X is a member selected from the group consisting of —O— and —CH$_2$)$_n$ (in which n is an integer 1 or 2).

6. The composition of claim 1 wherein R is an aliphatic saturated hydrocarbon group containing from 4 to 12 carbon atoms.

7. The composition of claim 6 wherein R is an aliphatic saturated hydrocarbon group containing from 8 to 12 carbon atoms.

8. A body fluid preservation vessel comprising the composition of claim 1.

9. The vessel of claim 8 wherein the body fluid is blood.

10. A catheter comprising the composition of claim 1.

11. A blood transfusion set comprising the composition of claim 1.

12. An aqueous infusion set comprising the composition of claim 1.

13. A blood circuit comprising the composition of claim 1.

* * * * *

UNITED STATES PATENT AND TRADEMARK OFFICE
CERTIFICATE OF CORRECTION

PATENT NO. : 4,560,720

DATED : December 24, 1985

INVENTOR(S) : Juuro AOYAGI et al

It is certified that error appears in the above-identified patent and that said Letters Patent is hereby corrected as shown below:

Column 2, line 13, change the formula "$-CH_2)_n$" to

-- $(CH_2)_n$ --.

Column 2, line 43, change the formula "$-CH_2)_n$" to

-- $(CH_2)_n$ --.

Column 2, line 47, change the formula "$-CH_2)_n$" to

-- $(CH_2)_n$ --.

Column 3, line 67, change the formula "$-CH_2)_n$" to

-- $(CH_2)_n$ --.

Column 4, line 15, change the formula "$-CH_2)_n$" to

-- $(CH_2)_n$ --.

UNITED STATES PATENT AND TRADEMARK OFFICE
CERTIFICATE OF CORRECTION

PATENT NO. : 4,560,720  PAGE 2 OF 2.
DATED : December 24, 1985
INVENTOR(S) : Juuro AOYAGI et al It is certified that error appears in the above-identified patent and that said Letters Patent is hereby corrected as shown below:

Column 4, line 17, change the formula "$-CH_2)_n$" to

-- $(CH_2)_n$ --.

Column 7, line 5, change "1 1." to --1$\ell$--.

Column 7, line 19, change "1 1." to --1$\ell$--.

Column 11, line 38, change the formula "$-CH_2)_n$" to

-- $(CH_2)_n$ --.

Column 12, line 17, delete "incorporated".

Column 12, line 21, change the formula "$-CH_2)_n$" to -- $(CH_2)_n$ --.

Signed and Sealed this

Ninth Day of December, 1986

Attest:

DONALD J. QUIGG

*Attesting Officer*  *Commissioner of Patents and Trademarks*